United States Patent [19]
Richards

[11] 3,709,303
[45] Jan. 9, 1973

[54] PLOW RAKE

[76] Inventor: Hugh W. Richards, 850 Cedar Street, Carrollton, Ga. 30117

[22] Filed: Sept. 1, 1971

[21] Appl. No.: 176,857

[52] U.S. Cl. .................171/86, 171/63, 172/197
[51] Int. Cl. ...............................A01d 15/02
[58] Field of Search........171/63, 64, 65, 86, 89, 101, 171/102, 107; 172/189, 197, 198, 200; 37/118 R; 56/400.04, 400.05, 400.06, 400.07, 400.11

[56] References Cited

UNITED STATES PATENTS

| 2,840,933 | 7/1958 | Brem | 172/197 |
|---|---|---|---|
| 2,840,935 | 7/1958 | Bird et al. | 172/197 |
| 1,106,190 | 8/1914 | Conine | 171/89 |
| 976,811 | 11/1910 | Kloss | 171/86 |

*Primary Examiner*—Antonio F. Guida
*Attorney*—Van C. Wilks

[57] ABSTRACT

This disclosure relates to a plow rake for landscaping purposes which is capable of movement to three different positions wherein, in a first position, it can pick up rocks, sticks, and trash while permitting dirt to filter through and back into the ground, a second position in which a long, transverse blade is caused to scrape the ground smooth, and a third position in which plow points are caused to turn the ground being landscaped.

11 Claims, 4 Drawing Figures

PATENTED JAN 9 1973 3,709,303

INVENTOR.
HUGH W. RICHARDS
BY VAN C. WILKS
ATTORNEY

PLOW RAKE

BACKGROUND OF THE INVENTION

This invention relates to an improvement in a landscaping attachment for tractors, and is more particularly suited for attachment to the three point hitch that is normally utilized with tractors of the landscaping and general farm use type.

In the art of preparing land around houses for use as lawns and yards, the presence of rocks, sticks, and other debris either present in the soil originally or littered about during the construction phase of the house has heretofore been a problem for the yard landscaper. In order to have a nice lawn which will adequately grow grass and provide suitable locations for shrubs and bushes while avoiding damage to lawn cutting implements, all such rocks, trash, sticks and other impediments should be removed prior to planting or sodding. Heretofore, such preparation has been performed by the laborious task of hand raking and hand removal of such items from the soil. Such methods of removing the debris by hand cause high labor costs and result in menial, uninspiring work for the labor force so involved.

Although I primarily describe my invention for use in clearing land for use as lawns, yards, and other residential landscaping tasks, it is by no means to be considered limited thereto because it has equal applicability to the clearing of rocks, sticks, and other debris from farm land and other commercial land usages.

SUMMARY OF THE INVENTION

My invention is particularly adaptable to presently produced commercial tractors because my invention is specifically designed to be connected to the standard three point hitch normally accompanying such tractors.

I have also found that it is possible to embody within one unit a device which not only is capable of picking up loose stones, sticks, and debris while depositing the soil surrounding such impediments back onto the ground, but also to incorporate two other useful landscaping features into the same unit. Therefore, I have designed my device in such a manner that it is capable of plowing up the top layer of soil prior to the utilization of the soil filtering and separating portion of my invention. A second feature which I have added is a soil smoothing blade more particularly adapted to be dragged over the soil in only slight contact therewith so as to smooth out any lumps or irregularities generated by the impediment filtering step.

Therefore, it is an object of the invention to provide an improved and efficient stone, stick, and debris collector for use in conjunction with prior art, commercially known tractors.

It is another object of my invention to provide a tractor attachment having improved flexibility of use by possessing three operating positions, one for plowing, one for straining impediments from the soil, and one for smoothing out the soil.

A still further object of the invention is to provide a soil gathering implement which is capable of collecting soil for movement to distant locations through the insertion of a soil-impeding plate into the main debris collecting portion of my device.

To the accomplishment of these and related objects as shall become apparent as the description proceeds, the invention resides in the construction, combination and arrangement of parts as shall be hereinafter more fully described, illustrated in the accompanying drawings, and pointed out in the claims hereunto appended.

The invention will be best understood and can be more clearly described when reference is had to the drawings forming a part of this disclosure wherein like characters indicate like parts throughout the several views.

IN THE DRAWINGS

DESCRIPTION OF THE PREFERRED EMBODIMENT

Figure 1:
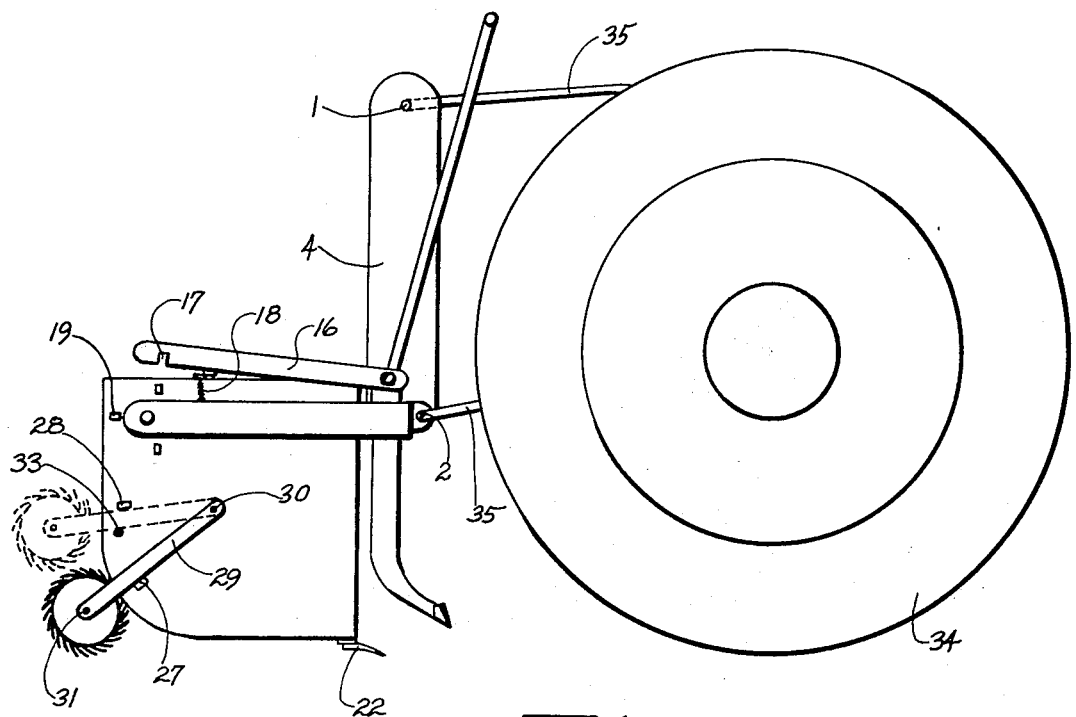
FIG. 1 is a side elevation of a preferred embodiment of the invention attached to the three point hitch of a tractor and showing the invention in its debris filtering position.

While my invention is usable with any tractor or truck having a power lifted draw bar, I have depicted my invention herein as being connected to the three point hitch of a commercial tractor, only the rear wheel 34 of which is shown. Points 1, 2, and 3 represent the points of attachment of the tractor's three point hitch 35 to the main frame 4 of my plow rake. Frame 4 is connected as its lower extremity to transversely oriented drafting bar 5 having rigidly affixed, rearwardly extending support arms 6 on either side thereof. Each of the support arms 6 has a pivot pin 7 at its distal end, said pivot pins penetrating entirely through the support arms and being rigidly affixed to side plates 8 of bucket assembly 9.

Drafting bar 5 has depending therefrom a plurality of plow bars 10 having plow points 11 on the tips thereof. Plow bars 10 penetrate the drafting bar 5 and are securely affixed therein by welding or the like. Mounted on top of drafting bar 5 is operating assembly 12 having actuating lever 13 extending upwardly in juxtaposition to main frame 4, said lever having handle 14 at the distal end thereof in close proximity to the tractor's operator. Operating assembly 12 is mounted on the upper surface of drafting bar 5 by the use of mounting plates 44 which provide pivot positions for operating rod 15 to rotate in response to movement of actuating lever 13. Rigidly affixed to each end of operating rod 15 are operating arms 16 which also extend rearwardly toward bucket assembly 9 and which have locking notches 17 therein. Operating arms 16 are urged downward toward support arms 6 through the use of operating springs 18 which are also located one on either side of the bucket assembly. Operating springs 18 urge the operating arms 16 back into a locked position after the bucket assembly has been released through actuation of the operating assembly 12. Mounted on each of the side plates 8 are a set of three stop lugs 19 which fit securely within locking notches 17.

Bucket assembly 9 comprises side plates 8 which are joined together by transverse mounting bars 20, 21. Mounting bar 20 has securely affixed thereto, as by welding, bolts, or the like, long, transverse plow blade 22. Individual rake teeth 23 are formed in the configuration of the side plates and are securely affixed on either end thereof to mounting bars 20, 21. Interstices 24 are thusly formed between the rake teeth 23. Interstices 24 are of such a width as to permit the free passage of dirt therethrough but without permitting stones or sticks to filter through the bucket assembly.

In order to enhance the filtering action of the bucket assembly, I have provided agitation rotor 25 which, as depicted herein, is shown as a long cylinder extending the entire transverse width of the bucket assembly. Agitation rotor 25 has spikes or tines 26 mounted in serpentine fashion thereon (see FIG. 3) in such a manner that the tines fit cleanly into the interstices 24 of the bucket assembly 9.

Operating assembly 12 is also provided with a stop bar 34 which is securely affixed to operating rod 15 and which is limited in its movement in the vertical plane by two stop locks 36, 37. The two stop locks prevent excess movement of actuating lever 13 by limiting the movement of stop bar 34 as the operating assembly 12 is actuated.

Figure 2:
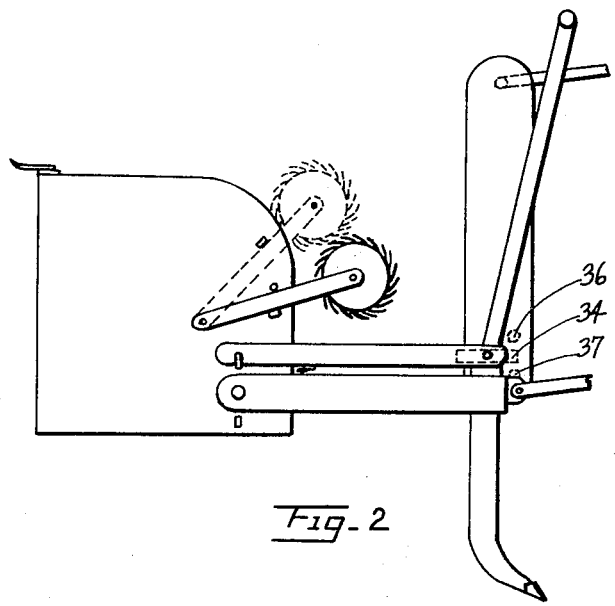
FIG. 2 is a second side elevation, similar to FIG. 1, but showing the implement of my invention in its plowing position.

In operation, the plow rake of my invention is first oriented into its plowing position by rotating bucket assembly 9 clockwise until it has reached the position shown in FIG. 2. In order to achieve the plowing position shown in FIG. 2 it is necessary for the tractor operator to pull on handle 14 which causes operating arms 16 to be raised from stop lugs 19. It then is necessary to physically raise the bucket assembly 9 into the plowing position. Once the bucket assembly is so raised, actuating lever 13 may be released thereby permitting operating springs 18 to pull operating arms 16 back into their lower position around stop lugs 19 and thereby holding the entire bucket assembly into a fixed position for plowing. The operator of the tractor then actuates the power take off of the tractor to thereby lower the three point hitch 35 until the plow points 11 have descended into the soil a distance commensurate with the desires of the individual landscaper. The tractor is utilized to traverse the ground and plow up the soil containing the impediments such as rocks, sticks, and other debris.

Figure 3:
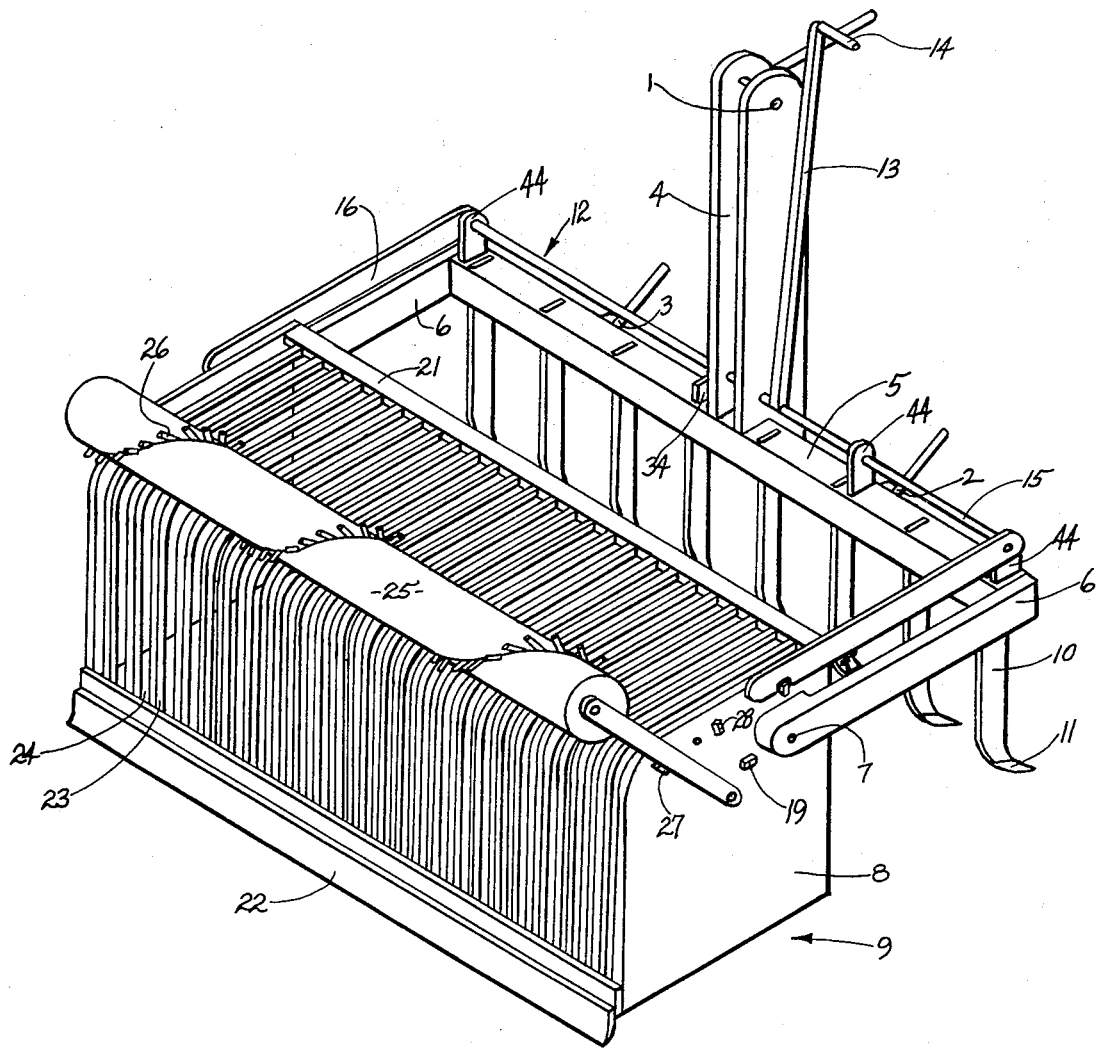
FIG. 3 is an isometric view of the implement of my invention, viewed from above, and showing the bucket assembly lowered into its soil smoothing position.
Figure 4:
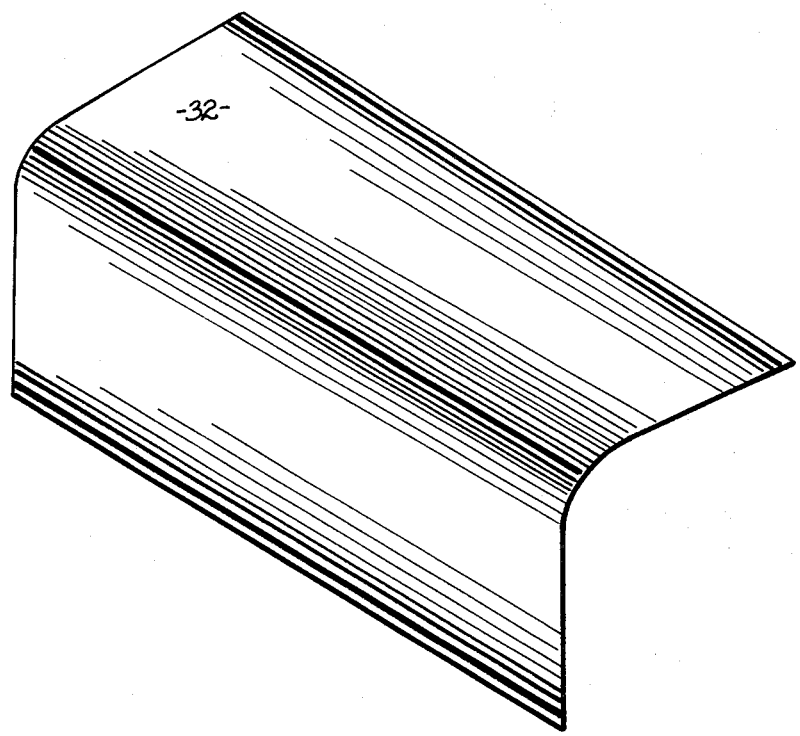
FIG. 4 is an isometric view of the soil collecting plate of my invention which has been removed from the debris collecting bucket.

At the conclusion of the plowing operation it is necessary to remove the loose impediments which have been plowed up but to do so without unnecessary removal of the top soil. For this purpose, the plow rake of my invention is placed into its debris filtering and collecting position as shown in FIG. 1. This is achieved by having the operator of the tractor raise the bucket assembly using the power take off and then moving actuating lever 13 forward which raises operating arms 16 and thereby releases the entire bucket assembly 9. The bucket assembly rotates about pins 7 from its plowing position to its debris collecting position by the force of gravity once locking notches 17 have cleared stop lugs 19. The three point hitch 35 is again lowered until plow blade 22 just touches the surface of the ground or is embedded slightly therein. As the tractor moves forward the debris-containing soil is caused to flow into the bucket assembly 9. Upon movement into the bucket assembly, the dirt is permitted to freely pass through interstices 24 and for this purpose is aided in its passage by agitation rotor 25 and tines 26. Agitation rotor 25 is powered by rolling along the ground behind the bucket assembly 9 and therefore smoothes out the dirt which has filtered through interstices 24. Any rocks, sticks, or other debris larger than interstices 24 will collect within the bucket assembly 9. At the conclusion of this debris collecting operation, the bucket assembly 9 can be emptied at a debris collection point by the actuation of lever 13 and the movement forward of the tractor. This causes plow blade 22 to dig into the ground and the bucket assembly to rotate about pivot pins 7 and into a ground smoothing position such as shown in FIG. 3. At this point in time, the operator of the tractor can lock the bucket assembly into its smoothing position and then raise the entire plow rake assembly through the use of his power take off mechanism, thereby clearing the pile of debris so collected. The tractor can then freely move away from such debris without dragging it behind.

The soil is now ready for a third operation, if desired, that being the smoothing operation. This is accomplished by orienting the bucket assembly 9 into the ground smoothing position as shown in FIG. 3. With the bucket assembly oriented as shown in FIG. 3, the operator of the tractor actuates the three point hitch to lower the plow rake so that the plow blade 22 just barely digs into the ground. With the bucket assembly in this position the tractor operator moves the tractor forward and this operation adds a final, smoothing touch to the soil to be landscaped. If desired, additional smoothing may be accomplished by attaching a large-link drag chain to the bucket assembly, at pivot pins 7 or 30 for instance. Such a drag chain could even be used in lieu of rotor 25.

It is also possible to utilize my invention for the purpose of collecting dirt for movement to distant locations. This is accomplished by orienting the bucket assembly 9 into the position shown in FIG. 1 and raising agitation rotor 25 into the dotted line position as shown in FIG. 1. The rotor arms 29 and agitation rotor 25 are held in this dotted line position by the use of two rotor arm locking pins 33 which are inserted into holes in the side plates 8. The agitation rotor 25 is raised in this manner so that the spikes 26 will be caused to remain out of interstices 24. In this manner scooping plate 32 may be inserted into the bucket assembly by the use of snaps, bolts, or the like (not shown). With the scooping plate 32 in position in the bottom of bucket assembly 9 it is possible to use my plow rake to scoop up and collect dirt by utilizing the three point hitch 35 to lower the bucket assembly 9 (oriented as shown in FIG. 1) until the plow blade 22 is in desired depth contact with the surface of the soil. Forward movement of the tractor then enables the dirt to be collected within the bucket assembly. It should be noted that additional plow points could be affixed to plow blade 22, if desired, thereby giving the plow blade greater soil turning capabilities.

Although only a preferred embodiment of the invention has been specifically illustrated and described herein, it is to be understood that minor variations may be made without departing from the spirit of the invention.

I claim:

1. A plow rake apparatus for removing stones, sticks, debris and the like from the ground comprising an operating assembly and a bucket assembly, said bucket assembly comprising a debris collecting means and a soil smoothing means, said bucket assembly being mounted for rotation, said rotation being about pivot points located on either side of said bucket assembly, said bucket assembly having a first position wherein the plow rake apparatus has means for plowing up the surface of the soil thereby loosening impediments contained on the surface and closely beneath the surface of said soil, said bucket assembly being rotatable for approximately 180° from said first position into a second debris filtering and collecting position in which the plowed up soil and debris are caused to flow into a debris collecting means within said bucket assembly, means subsequently causing said collected soil to flow through and out the debris collecting means and to be deposited back on the surface of the ground while said debris is retained within said debris collecting means, said bucket assembly being rotatable for approximately 90° from said second position into a third position in which a smoothing means on said apparatus is placed in contact with the filtered soil whereby said filtered soil may be smoothed over.

2. The invention of claim 1 in which said bucket assembly further comprises side plates and mounting bars extending between said side plates and rake teeth securely affixed between said mounting bars.

3. The invention of claim 2 in which said rake teeth are spaced apart to form interstices therebetween, said interstices being of such a dimension as to permit the free passage of soil therethrough without permitting debris to pass therethrough.

4. The invention of claim 3 and further comprising an agitation rotor movably mounted on said side plates, said agitation rotor having tines extending into said interstices.

5. The invention of claim 4 wherein operation of said apparatus in its second position causes rotation of said agitation rotor.

6. The invention of claim 4 wherein said agitation rotor is movable into a non-agitation position and means for securing said rotor in said non-agitation position.

7. The invention of claim 4 wherein said tines are arranged on said agitation rotor in a serpentine configuration.

8. The invention of claim 1 in which the bucket assembly is rotated about a single axis in order to attain each of said positions.

9. The invention of claim 1 and additionally comprising means for agitating the collected soil and debris in said debris collecting means whereby the soil is caused to pass more freely through said debris collecting means.

10. A plow rake apparatus for removing stones, sticks, debris and the like from the ground comprising an operating assembly and a bucket assembly, said bucket assembly comprising a debris collecting means, said bucket assembly being rotatable about pivot points located on either side of said bucket assembly, said bucket assembly having a first position wherein the plow rake apparatus has adjustable means for plowing up the surface of the soil thereby loosening impediments contained on the surface and closely beneath the surface of said soil, said bucket assembly being rotatable for approximately 180° to a second debris filtering and collecting position in which the plowed up soil and debris are caused to flow into the debris collecting means within said bucket assembly, and means subsequently causing said collected soil to flow through and out the debris collecting means and to be deposited back on the surface of the ground while said debris is retained within said debris collecting means.

11. A vehicle mounted plow rake assembly for removing stones, sticks, debris and the like from the ground comprising a vehicle equipped with a power take off mechanism, said plow rake assembly comprising an operating assembly and a bucket assembly, said bucket assembly comprising a debris collecting means and soil smoothing means, said bucket assembly being mounted for rotation on a single axis, said bucket assembly being rotatable about said single axis into a first position in which actuation of said power take off places said operating assembly into contact with the soil so that movement of said vehicle will cause plow means on said operating assembly to plow up the surface of the soil thereby loosening impediments contained on the surface and closely beneath the surface of said soil, said bucket assembly being rotatable about said single axis into a second debris filtering and collecting position in which vehicular movement will cause the plowed up soil and debris to flow into a debris collecting means within said bucket assembly, means subsequently causing said collected soil to flow through and out the debris collecting means and to be deposited back on the surface of the ground while said debris is retained within said debris collecting means, said bucket assembly being rotatable about said single axis into a third position in which a portion of said apparatus is placed in contact with the filtered soil whereby vehicular movement causes the filtered soil to be smoothed over.

* * * * *